United States Patent [19]

Goto et al.

[11] Patent Number: 4,979,333
[45] Date of Patent: Dec. 25, 1990

[54] WEATHER STRIP FOR MOTOR VEHICLE

[75] Inventors: Yoshinori Goto, Kakamihara; Hideyuki Hashimoto, Nishikasugai; Masahiro Nozaki, Ama, all of Japan

[73] Assignee: Toyoda Gosei Co., Ltd., Nishikasugai, Japan

[21] Appl. No.: 367,604

[22] Filed: Jun. 19, 1989

[30] Foreign Application Priority Data

Jul. 28, 1988 [JP] Japan .................. 63-100319[U]

[51] Int. Cl.⁵ .................................. E06B 7/16
[52] U.S. Cl. ........................ 49/483; 49/479; 49/485
[58] Field of Search .................. 49/483, 485, 479

[56] References Cited

U.S. PATENT DOCUMENTS 3,226,780  1/1966  Landis ........................ 49/483 X
3,995,082  11/1976  Minhinnick et al. .
4,492,405  1/1985  Chikaraishi et al. ........... 49/483 X

FOREIGN PATENT DOCUMENTS 63-235143  9/1988  Japan .

Primary Examiner—Philip C. Kannan
Attorney, Agent, or Firm—Cushman, Darby & Cushman

[57] ABSTRACT

A weather strip is provided to be attached along a door opening of a vehicle body. The weather strip has a main portion to come into pressure contact with a peripheral edge of a door frame or a door glass when a door is closed and an end portion connected to an end of the main portion, which is to be partially pressed by an end portion of a door weather strip when the door is closed. The end portion has a thickness which gradually decreases towards a lower end thereof. The lower end of one portion of the end portion, which is to be pressed by the end portion of the door weather strip is thinner than that of the other portion of the end portion like the edge of a blade. When the door is closed, the thinner lower end of the end portion is pressed by the end portion of the door weather strip. At this time, no space remains between the vehicle body and the door weather strip thereby maintaining desirable sealing performance.

4 Claims, 2 Drawing Sheets

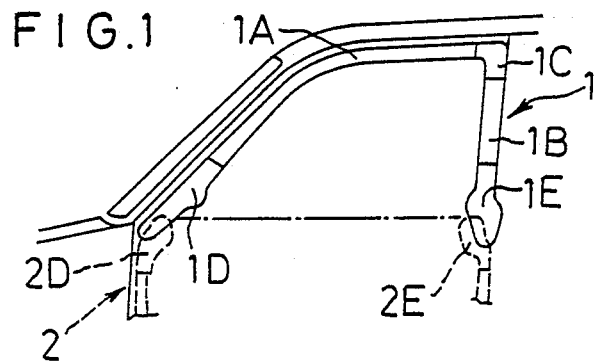
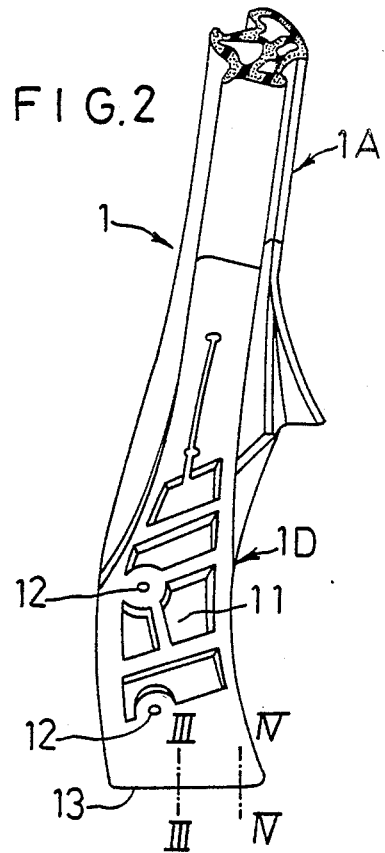

WEATHER STRIP FOR MOTOR VEHICLE

BACKGROUND OF THE INVENTION

1. Field of the Invention

The present invention relates to a weather strip to be attached along a door opening of a motor vehicle, and more particularly to the structure of an end portion of the weather strip.

2. Description of the Prior Art

As shown in FIG. 1, a weather strip 1 formed of rubber or synthetic resin is attached along a door opening of a vehicle body. When the door is closed, this weather strip 1 seals the clearance between a door frame or a peripheral edge of a door glass of a frameless door, and the vehicle body.

The weather strip 1 is composed of an extruded front portion 1A, an extruded rear portion 1B, a molded corner portion 1C connecting the extruded front portion 1A to the extruded rear portion 1B, and molded end portions 1D, 1E, which are provided at a lower end of the extruded front portion 1A and the extruded rear portion 1B, respectively.

A weather strip 2 for effecting a seal between the door and the vehicle body is attached along the door. This weather strip 2 is provided with molded end portions 2D and 2E at respective upper ends of the extruded portions. When the door is closed, the end portions 2D, 2E of the weather strip 2 come into pressure contact with the end portions 1D, 1E of the weather strip 1, respectively.

The thickness of each of the end portions 1D, 1E of the weather strip 1 gradually decreased towards a lower end thereof. The thickness of the lower end of each of the end portions 1D, 1E is ordinarily about 0.5 mm. When the door is closed, the end portions 2D, 2E of the weather strip 2 are pressed against the end portions 1D, 1E of the weather strip 1, respectively, to generate a space 3 of a triangular section in front of the end portion 1D (1E) between a body panel 4 and the end portion 2D (2E) of the weather strip 2, as shown in FIG. 6. This space 3 decreases the sealing performance of the weather strip 1.

The generation of the space 3 can be prevented by forming a lower end 13 of the end portion 1D (1E) thin, like an edge of a blade. However, when the lower end 13 of the end portion 1D (1E) is formed thin throughout the entire width thereof, the lower end 13 becomes unstable in shape due to insufficient rigidity, and accordingly is not brought into close contact with the body panel 4. This results in the lower end 13 being likely to peel off the body panel 4 when the door is opened.

SUMMARY OF THE INVENTION

It is an object of the present invention to provide a structure for the end portion of a weather strip, which does not generate a space with an end portion of an opposed weather strip which comes into pressure contact therewith when the door is closed, and avoids peeling of a lower end of the end portion of the weather strip off the vehicle body when the door is opened.

The present inventors have discovered that when the door is closed, the end portion of the weather strip attached to the door comes into pressure contact with not the entire but only part of the end portion of the weather strip attached to the vehicle body, which discovery resulted in the present invention.

The weather strip according to the present invention is provided with a main portion which comes into pressure contact with a peripheral edge of a door frame or door glass when a door is closed, and an end portion provided at an end of the main portion, which is to be partially pressed by an end portion of a weather strip attached along the door, when the door is closed. The lower end of only one portion of the end portion of the weather strip attached to the vehicle body, to which the end portion of the weather strip attached to the door is pressed, is formed thin like an edge of a blade. The lower end of the remaining portion of the end portion of the weather strip attached to the vehicle body is formed thick, similar to the conventional weather strip.

By forming the lower end of only one portion of the end portion of the weather strip attached to the vehicle body, to which the end portion of the weather strip attached to the door is pressed, thin like an edge of a blade, no space is generated between the vehicle body and the weather strip attached to the door, and accordingly desirable sealing performance can be maintained.

The lower end of the other portion of the end portion of the weather strip attached to the vehicle body is formed thick so as to have rigidity or shape retention sufficient enough to be firmly secured to the vehicle body. Therefore, the blade edge-shaped lower end adjacent to the thick formed lower end which is firmly secured to the vehicle body can be restrained from rising or peeling from the vehicle body.

The blade edge-shaped lower end in a free state is preferably curved toward the vehicle body. By curving the blade edge-shaped lower end toward the vehicle body, the end portion of the weather strip can be attached to the vehicle body in the state pressed to the vehicle body so as to prevent the blade edge-shaped lower end of the weather strip from rising or peeling from the vehicle body which greater certainty.

BRIEF EXPLANATION OF THE DRAWINGS

FIG. 1 is an overall view of a weather strip;

FIG. 2 is a perspective view illustrating a rear surface of an end portion of a weather strip;

DETAILED DESCRIPTION OF THE EMBODIMENTS

Figure 3:
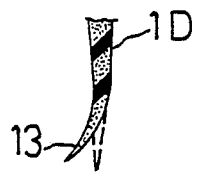
FIG. 3 is a sectional view taken along the line III—III of FIG. 2.

As shown in FIG. 1, a weather strip 1 formed of rubber is attached along a roof side and a center pillar of a door opening of a motor vehicle. The weather strip 1 is composed of extruded portions 1A, 1B, a molded corner portion 1C, and molded end portions 1D and 1E.

A weather strip 2 formed of rubber is attached along a peripheral edge of a door. Molded end portions 2D, 2E are formed at both upper ends of the weather strip 2.

When the door is closed, the end portions 2D, 2E come into pressure contact with the respective end portions 1D, 1E.

The construction of the end portions of the weather strip 1 attached along the door opening will be explained based on the end portion 1D positioned on the front side of the motor vehicle with reference to FIG. 2. The width of the end portion 1D increases towards a lower end thereof, and in the reverse surface of the end portion 1D are formed a plurality of concavities 11. The end portion 1D is further provided with a plurality of clip holes 12. The end portion 1D having the above described construction is secured to a body panel 4 (FIG. 5) by means of a plurality of clips (not shown).

Figure 4:
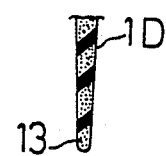
FIG. 4 is a sectional view taken along the line IV—IV of FIG. 2.

FIGS. 3 and 4 illustrate cross sections of the end portion 1D. The thickness of the end portion 1D gradually decreases towards a lower end 13 thereof. The lower end 13 of one portion of the end portion 1D, with which the end portion 2D of the weather strip 2 (FIG. 1) comes into pressure contact when the door is closed is thin like the edge of a blade as shown in FIG. 3. The lower end 13 of the remaining portion of the end portion 1D is not thin like the edge of a blade but has a thickness of about 0.5 mm as shown in FIG. 4. The blade edge-shaped lower end 13 in a free state is curved toward its reverse surface as shown in FIG. 3, that is toward a body panel to which the weather strip 1 is to be attached. When the weather strip 1 is attached, the blade edge-shaped lower end 13 is pushed outward by the body panel to have a shape as shown by the broken line in FIG. 3.

Figure 5:
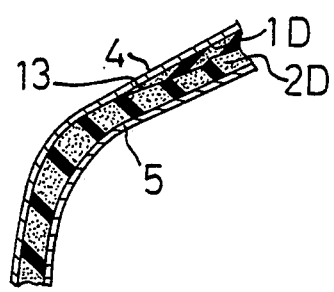
FIG. 5 is a sectional view illustrating the state where end portions of a weather strips attached to a vehicle body and a door, respectively, come into pressure contact with each other in accordance with the invention.
Figure 6:
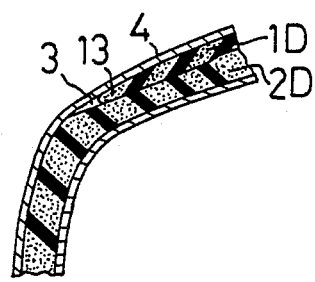
FIG. 6 is a sectional view similar to FIG. 5, illustrating the state of the conventional weather strip.

FIG. 5 illustrates the state where the end portion 2D of the weather strip 2 is pressed against the end portion 1D of the weather strip 1 when the door is closed. The end portion 1D is secured to a body panel 4 by means of clips (not shown) while the end portion 2D is secured to a door panel 5 by means of clips (not shown). The lower end 13 of one portion of the end portion 1D, against which the end portion 2D is pressed, is thin like the edge of a blade, and is in pressure contact with the body panel 4 so that the outer surface of this portion of the end portion 1D becomes flush with the surface of the body panel 4. Therefore, the end portion 1D comes into close contact with the end portion 2D without generating any space therebetween.

Especially, by curving the blade edge-shaped lower end 13 toward the body panel 4, it can come into closer contact with the body panel 4.

The lower end of the end portion 1D except for the portion which is pressed by the end portion 2D is formed thick so as to be rigid. The thick lower end serves to secure the end portion 1D of the weather strip to the body panel 4 whereby preventing the rising or peeling of the blade edge-shaped lower end from the body panel 4.

What is claimed is:

1. A weather strip to be attached along a door opening of a body of a motor vehicle, comprising:
   a main portion for coming into pressure contact with a peripheral edge of one of a door frame and a door glass when a door of a motor vehicle is closed; and
   an end portion defined at an end of said main portion, which end portion is to be partially pressed by a second weather strip attached along the door, when the door is closed;
   said end portion having a thickness which gradually decreases towards a lower end thereof;
   a lowermost end of one portion of said end portion, which is to be pressed by said second weather strip, being substantially thinner than a lowermost end of another portion of said end portion.

2. A weather strip according to claim 1, wherein said weather strip is composed of one of rubber and synthetic resin, and said end portion is formed by molding.

3. A weather strip according to claim 2, wherein said lowermost end of said one portion is curved toward a body panel of the motor vehicle, whereby when said weather strip is attached to the body panel, said lowermost end of said one portion is pushed outward by the body panel and comes into pressure contact with the body panel.

4. A weather strip according to claim 1, said lowermost end of said one portion has a blade edge.

* * * * *